United States Patent [19]

Janke

[11] Patent Number: 4,735,057
[45] Date of Patent: Apr. 5, 1988

[54] SWITCHING CIRCUIT FOR A REFRIGERATOR CONTROL

[75] Inventor: Donald E. Janke, Benton Township, Berrien County, Mich.

[73] Assignee: Whirlpool Corporation, Benton Harbor, Mich.

[21] Appl. No.: 945,019

[22] Filed: Dec. 22, 1986

[51] Int. Cl.$^4$ ............................................. F25D 17/04
[52] U.S. Cl. ...................................... 62/187; 236/49; 318/345 G
[58] Field of Search .................. 62/187, 186; 236/1 B, 236/49; 318/436, 347, 345 C, 345 G

[56] References Cited

U.S. PATENT DOCUMENTS

| | | | |
|---|---|---|---|
| 3,221,237 | 11/1965 | Kalenian | 318/347 |
| 3,251,548 | 5/1966 | Foster | 236/1 B |
| 3,384,801 | 5/1968 | Rodgers | 318/345 G |
| 3,402,478 | 9/1968 | Hetrick | 318/483 X |
| 3,471,938 | 10/1969 | Elders | 34/45 |
| 3,575,652 | 4/1971 | Snyder | 318/341 |
| 3,707,776 | 1/1973 | Schmidgall | 34/45 |
| 3,765,100 | 10/1973 | Heidtmann | 34/45 |
| 3,829,010 | 8/1974 | Jones | 236/49 |
| 3,962,617 | 6/1976 | Offutt et al. | 318/444 |
| 4,646,531 | 3/1987 | Song | 62/187 |

Primary Examiner—Harry B. Tanner
Attorney, Agent, or Firm—Hill, Van Santen, Steadman & Simpson

[57] ABSTRACT

An AC voltage motor switching circuit for a refrigerator control has a temperature responsive portion connected to provide gate current to an SCR which is connected with a reverse-poled diode to form a parallel combination, which together are in series with the AC motor and a charging capacitor. When the SCR is gated on, the SCR conducts positive half-waves of the voltage source and the diode conducts negative half-waves causing the capacitor to become an AC reactance device and, thus, the motor to be energized. When the SCR is gated off, only the negative half-waves of the AC signal are capable of being transmitted through the diode which fully charges the capacitor and prevents current flow through the windings of the motor to deenergize the motor.

18 Claims, 2 Drawing Sheets

FIG. 1
FIG. 2
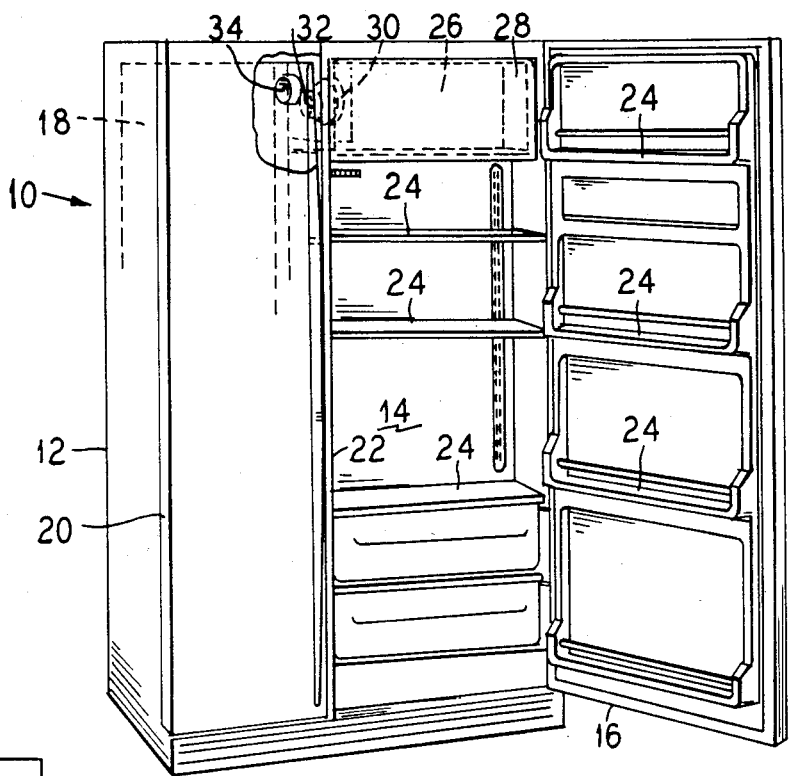
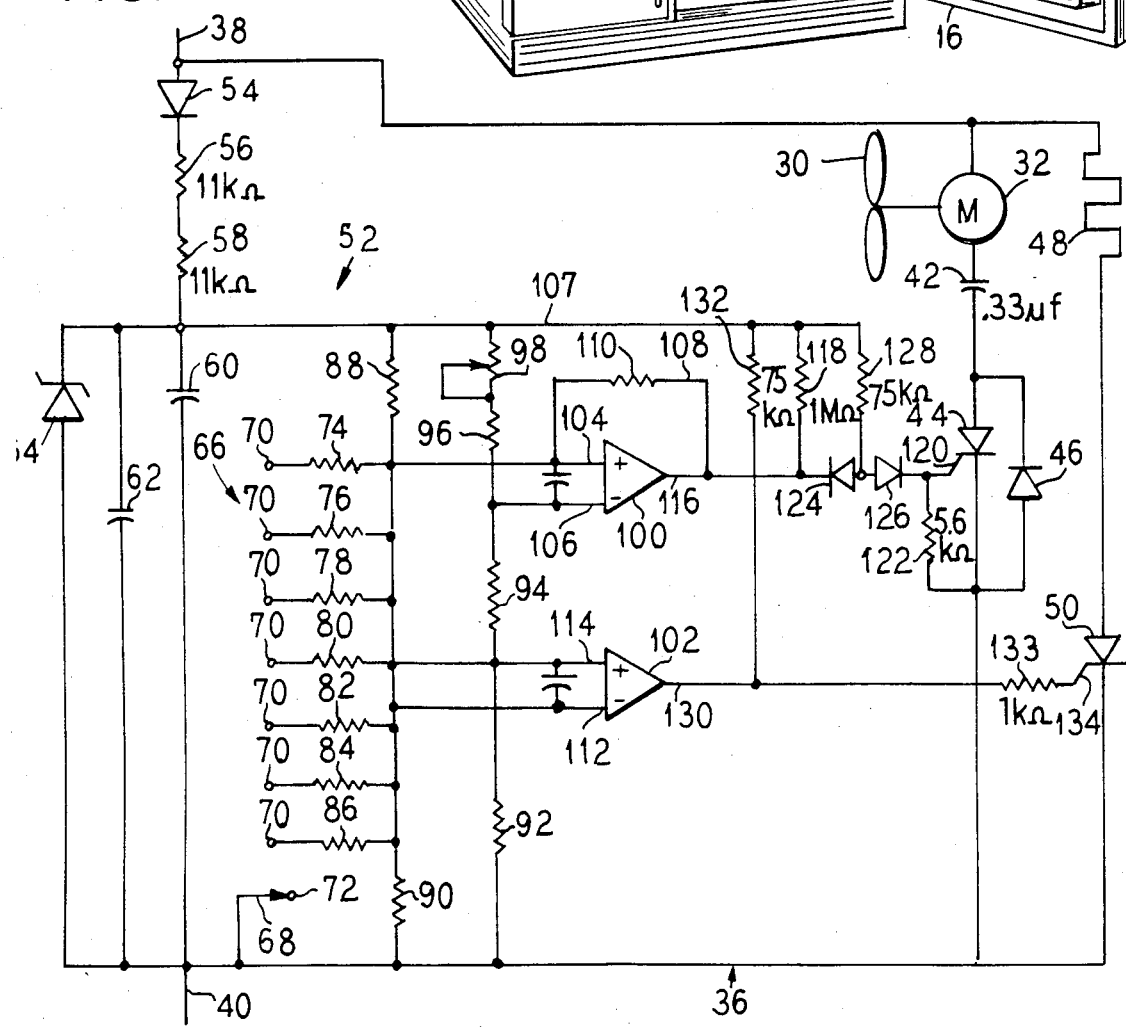

SWITCHING CIRCUIT FOR A REFRIGERATOR CONTROL

BACKGROUND OF THE INVENTION

1. Field of the Invention

The present invention relates to a circuit for switching a single phase AC operated device between the on and off states and, more particularly, to a switch for controlling an AC motor in a refrigerator control circuit.

2. Description of the Prior Art

Several control circuits are known for controlling AC operated devices in response to temperature changes in an environment. For instance, Jones U.S. Pat. No. 3,829,010 discloses a thermostat for power ventilators and the like. A power ventilator fan is driven by an electric motor connected in series with a triac, the triac being triggered in response to temperature changes detected by a pair of thermistors. Triggering of the triac closes a circuit to the motor to cause the operation thereof.

An on-off control means for an inductance means, such as a single phase AC motor, is disclosed in Schmidgall U.S. Pat. No. 3,707,776 which operates by resonance to selectively cause voltage and current to be out of phase with each other and thereby prevent operation of the inductance drive means. The disclosed circuit includes two capacitors C1 and C2, C2 being connected across a circuit including a motor in series connection with a parallel combination of an SCR and a reverse-poled diode. The capacitor C1 is connected in series with the rest of the circuit as a whole. When the SCR is not being gated, the capacitors C1 and C2 charge at each half cycle of the alternating current supply and then discharge and recharge with an opposite polarity on each subsequent half cycle. The current through the capacitors C1 and C2 will be out of phase with the current through the inductive motor device, causing the voltage across the motor to be zero. Current flows through the capacitors C1, C2 and the motor, even while the motor is deenergized.

Refrigerator and freezer control circuits are often found within the refrigerated compartments of the respective refrigerator or freezer and, therefore, any heat generated by the control circuits is transmitted to the refrigerated compartment. Thereafter, the heat must be removed from the compartment by the cooling apparatus. The generation and subsequent removal of heat from the refrigerated compartment results in multiplying the energy penalty of using an inefficient control circuit. Thus, to avoid this wasteful practice, control circuits, particularly those for use in refrigerated compartments, should be as energy efficient as possible.

SUMMARY OF THE PRESENT INVENTION

The present invention provides a highly efficient circuit for switching an AC operated device to avoid unnecessary heat generation. Furthermore, a smaller power supply is required for the present circuit, resulting in even more efficiency.

In particular, the present invention is embodied in a circuit connected to a single phase AC operated apparatus and includes a charge storage device connected in series with the AC operated apparatus. A parallel combination of a rectifier and a direct current switching device is also connected in series with the charge storage device and the AC operated device. The switching device is preferably triggered by a temperature responsive element so that the operation of the AC operated device is in response to temperature changes detected by the temperature responsive element.

The switching device, when triggered, causes AC power to be delivered to the AC operated apparatus. When the switching device is not triggered and, thus, does not conduct power to the AC operated device, only rectified portions of the AC signal are transmitted thereto. The rectified signal portions are also received by the charge storage device, where the charge from the rectified signal builds until it approximates the maximum instantaneous potential of the rectified signal. Such state can be referred to as "fully charged".

Upon the charge storage device reaching a fully charged state, effectively no power flows through the series circuit consisting of the charged storage device, the AC operated apparatus, and the parallel combination of the rectifier and the non-triggered switch.

In a preferred embodiment, the direct current switching device is a silicon controlled rectifier (SCR), which requires very little current, such as at a trigger or gate lead to switch to a conducting state. This means that less trigger current is dissipated by the trigger current supply circuit when the switching device is in a nonconducting as well as a conducting state. Thus, a significant reduction in power consumption is realized in the present invention. By way of comparison, an alternating current switching device, such as the triac shown in the Jones '010 patent, requires a trigger current of approximately 5 milliamps. In contrast, the direct current switching device of the present invention requires approximately two-tenths of a milliamp.

The principles revealed in this invention are particularly useful where power consumption, and the resulting heat dissipation, are critical. One example of such application is in a refrigerated environment. Less heat dissipation in a refrigerated environment means less heat to remove so that an energy savings is realized not only in less power being consumed by the control circuit but, in addition thereto, more efficient operation of the cooling apparatus.

The circuit is disclosed in conjunction with a refrigerator and/or freezer appliance, where it is mounted within a refrigerated compartment to control an AC operated air circulation control device, without itself having a significant unwanted effect on the air temperature within the appliance.

BRIEF DESCRIPTION OF THE DRAWINGS

FIG. 1 is a perspective view of a side-by-side refrigerator-freezer appliance incorporating the control circuit of the present invention;

FIG. 2 is a circuit diagram of a control circuit according to the principles of the present invention for use in the refrigerator-freezer appliance of FIG. 1;

DESCRIPTION OF THE PREFERRED EMBODIMENTS

Figure 3:
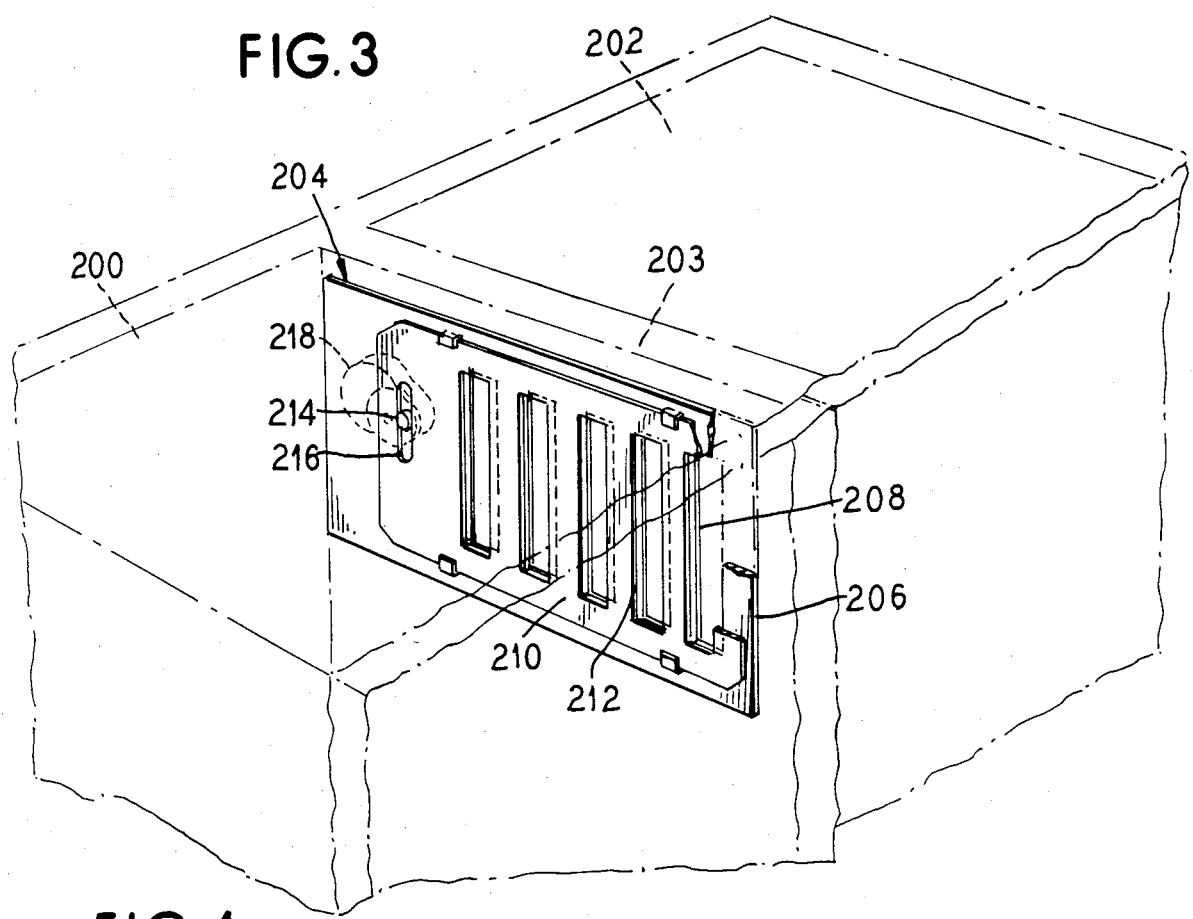
FIG. 3 is a fragmentary perspective view, partially in phantom, of an air control baffle for use in a side-by-side refrigerator-freezer appliance similar to that shown in FIG. 1.

FIG. 1 shows a side-by-side refrigerator-freezer generally at 10, including a cabinet 12 containing a refrigerator compartment 14 having an openable door 16 and a freezer compartment 18 having an openable door 20. A common dividing wall 22 separates the refrigerator compartment 14 from the freezer compartment 18. A plurality of shelves 24 ar mounted within both the refrigerator and freezer compartments 14 and 18, as well as on the interior surfaces of the doors 16 and 20. A temperature controlled compartment 26 is provided above the refrigerator compartment 14 that includes an interior door 28 which is accessible upon opening of the refrigerator door 16. Air flow to the temperature controlled compartment 26 is provided by a fan 30 driven by a fan motor 32. A duct 34 extends between the temperature controlled compartment 26 and the freezer 18.

Referring to FIG. 2, a control circuit 36 for operating the fan motor 32 is shown connected across AC power leads 38 and 40. The motor 32 is a single phase AC motor and is connected in series with a charge storage device in the form of a capacitor 42. Also in series with the motor 32 is a parallel connected combination consisting of an SCR (silicon-controlled rectifier) 44 and a diode 46, the anode of which is connected to the cathode of the SCR 44. The motor 32, capacitor 42, SCR 44, and diode 46 are in a branch connected directly across the AC power supply leads 38 and 40. An independently controlled branch consisting of a heater 48 in series with a second SCR 50 is also connected directly across the AC power supply leads 38, 40.

Trigger signals for the SCRs 44 and 50 are generated in a low voltage portion 52 of the circuit 36. Power is supplied to the low voltage 52 portion by a rectifier diode 54 and a pair of voltage dropping resistors 56 and 58. A pair of filtering capacitors 60 and 62, along with a zener diode 64, filter the rectified signal to provide a DC power supply across the low voltage portion 52.

A compartment temperature set-point slide control 66 includes a movable contact 68 selectively movable to one of a plurality of preset resistance connections 70, as well as to an open circuit connection 72. Each of the connection points 70 of the slide control 66 is connected to one of resistors 74, 76, 78, 80, 82, 84, and 86, while none is present at the open circuit connection point 72. The resistors 74-86 are of sequentially increasing resistance value and, thus, with the assistance of resistors 88 and 90, the slide control 66 provides a selectable reference voltage level in a first branch of the low voltage portion 52. The voltage levels provided by the slide control 66 correspond to predetermined temperatures so that a user can select a temperature level at which the compartment 26 is to be maintained. A temperature sensor 92 is mounted within the compartment 26 and is connected in series to fixed and variable resistors 94, 96, and 98 in a second branch of the circuit portion 52.

A pair of operational amplifiers 100 and 102 functioning as comparators generate trigger signals for the SCRs 44 and 50, respectively. A selectable reference voltage set by the slide control 66 is received at a noninverting input 104 of the comparator 100. An inverting input 106 of the comparator 100 is connected to the second branch to receive a signal which varies in response to temperatures sensed by the temperature sensor 92. Upon the voltage at the inverting input 106 reaching the reference voltage level set at the noninverting input 104, an output 116 of the comparator 100 changes state. A positive feedback loop 108 including a resistor 110 causes the comparator 100 to exhibit hysteresis s that the comparator's 100 return to the first state occurs at a different temperature than that for the initial change. The hysteresis prevents rapid cycling of the motor 32.

The second operational amplifier, or comparator, 102 has an inverting input 112 connected to the first branch to receive the reference voltage level from the slide control 66. A noninverting input 114 of the comparator 102 is supplied with an input as determined by the temperature sensor 92, although at a lower voltage than is received at the inverting input 106 of the comparator 100 due to the resistor 94 which acts as a voltage divider. The second comparator 102, thus, changes state at a lower temperature than the comparator 100. The resistor 94 defines a dead band temperature range between the respective change of state temperatures.

A pull-up resistor 128 is connected between a DC voltage bus 107 and a gate lead 120 of the SCR 44 through a diode 126, whose purpose will be explained below. The resistor 128 is of a preselected resistance value to provide sufficient gate current to cause the SCR 44 to be in a conducting state when the output 116 of the comparator 100 is in a high state. A resistor 122 is connected between the gate lead 120 of the SCR 44 and the ground lead 40. The resistor 122 desensitizes the gate lead 120 of the SCR 44 so the SCR 44 doesn't fire on transients.

The desensitizing resistor 122 and the gate 120 would tend to prevent the output 116 of the comparator 100 from reaching the full voltage level at the DC voltage bus 107 when the output 116 is in a high state. Unless the output 116 is allowed to reach the full DC voltage level, the feedback resistor 110 will not function properly to provide hysteresis to the temperature control circuit, as previously explained. To allow the output 116 to reach full DC voltage level, a diode 124 is inserted between the output 116 and the gate 120 and a resistor 118 of very high resistance value is connected between the DC voltage bus 107 and the output 116. The diode 124 is poled to be reverse-biased, and therefore nonconducting, when the output 116 is at a high state. Because the diode 124 is non-conducting when the output 116 is at a high state, the voltage level of the output 116 will be allowed to rise to the level of the voltage bus 107 to ensure proper functioning of the feedback resistor 110. A diode 126 is placed in the circuit that controls the gate 120 of the SCR 44 in order to cancel the small voltage drop across the diode 124 that occurs when the output 116 is at a low state. When the output 116 is in a low state, the diode 124 will be forward-biased and, if the voltage drop across the diode 124 is not cancelled, it is possible that the SCR 44 may not be gated to a nonconducting condition.

An output 130 of the comparator 102 likewise includes a pull-up resistor 132 to pull up the voltage level connected to a gate lead 134 of the SCR 50. The comparator 102 operates the heater 48 through the SCR 50.

The operation of the circuit 36 is as follows: when the compartment 26, as sensed by the temperature sensor 92, is colder than a desired temperature range, the comparator 102 provides a trigger signal in the form of a high signal over the lead 130. The high signal enables gate current to flow through the resistors 132 and 133, and the gate lead 134 to cause the SCR 50 to conduct power through the heater element 48 during positive half-waves of the AC signal and thereby warm the compartment 26. When the compartment temperature is warmed to within the preset range, the output 130 is switched to low and the gate current is shunted to ground through the comparator 102. Since the gate current is being dissipated by the resistor 132 even when the SCR 50 is off, it is important to have as low a gate current as possible for efficiency. Therefore, the present circuit utilizes an SCR 50 instead of a triac or other switching device, since an SCR requires about 0.2 ma gate current instead of 5 ma gate current for a triac.

The energy savings of using SCR switching devices is multiplied by the presence of the SCR 44, also in a nonconducting state when the sensed temperature is within the preset range. Furthermore, the SCR 44, when off, blocks current flow in both directions so that the only current capable of flowing through the windings of the motor 32 are negative half-waves passing through the diode 46. Since only a single polarity voltage is now applied to the capacitor 42 connected in series with the motor 32, the capacitor 42 charges until the voltage thereacross is approximately equal to the maximum instantaneous negative voltage transmitted by the diode 46. The charged-up capacitor 42, thus, effectively blocks current flow through the windings of the motor 32. The lack of current flow through the motor windings prevents the motor 32 from turning and eliminates heat dissipation which would have to be removed from the refrigerated environment within the refrigerator-freezer 10.

Should the compartment 26 become warmer than the selected temperature range as determined by the temperature sensor 92, the output 116 of the comparator 100 goes to a high level, enabling the resistor 128 to transmit a trigger signal through the diode 126 to the gate lead 120 of the SCR 44. The SCR 44, when on, conducts positive half-waves of AC power from the supply leads 38 and 40 in a forward direction so that the positive half-waves flow through the windings of the motor 32. Negative half-waves of the AC signal are transmitted through the diode 46, poled opposite to the SCR 44, to the windings of the motor 32. Thus, the capacitor 42 becomes an AC voltage reactance device and the motor 32 operates so that the fan 30 draws air into the compartment 26 from the freezer compartment 18 for cooling.

Although the present control circuit as shown in FIGS. 1 and 2 is connected to operate a single phase AC motor for cooling a compartment within a refrigerator-freezer, it may also be used to control fan motors in other applications and environments. The present invention is also adapted for controlling AC operated devices other than fan motors. For instance, in FIG. 3 is shown side-by-side refrigerator and freezer compartments 200 and 202 separated by a dividing wall 203 in which is mounted a baffle 204. The baffle 204 includes a fixed plate 206 having spaced vertical slots 208 therethrough. A movable plate 210 is slidably mounted adjacent the fixed plate 206, also with spaced vertical slots 212. Sliding movement of the movable plate 210 with respect to the fixed plate 206 opens and respectively closes air passageways between the two compartments 200 and 202.

Movement of the movable plate 210 is effected by a cam 214 riding in a slot 216 and driven by a motor 218. The motor 218 is operated to either open or close the baffle passageways between the two compartments 200 and 202 in response to temperatures sensed therein.

Figure 4:
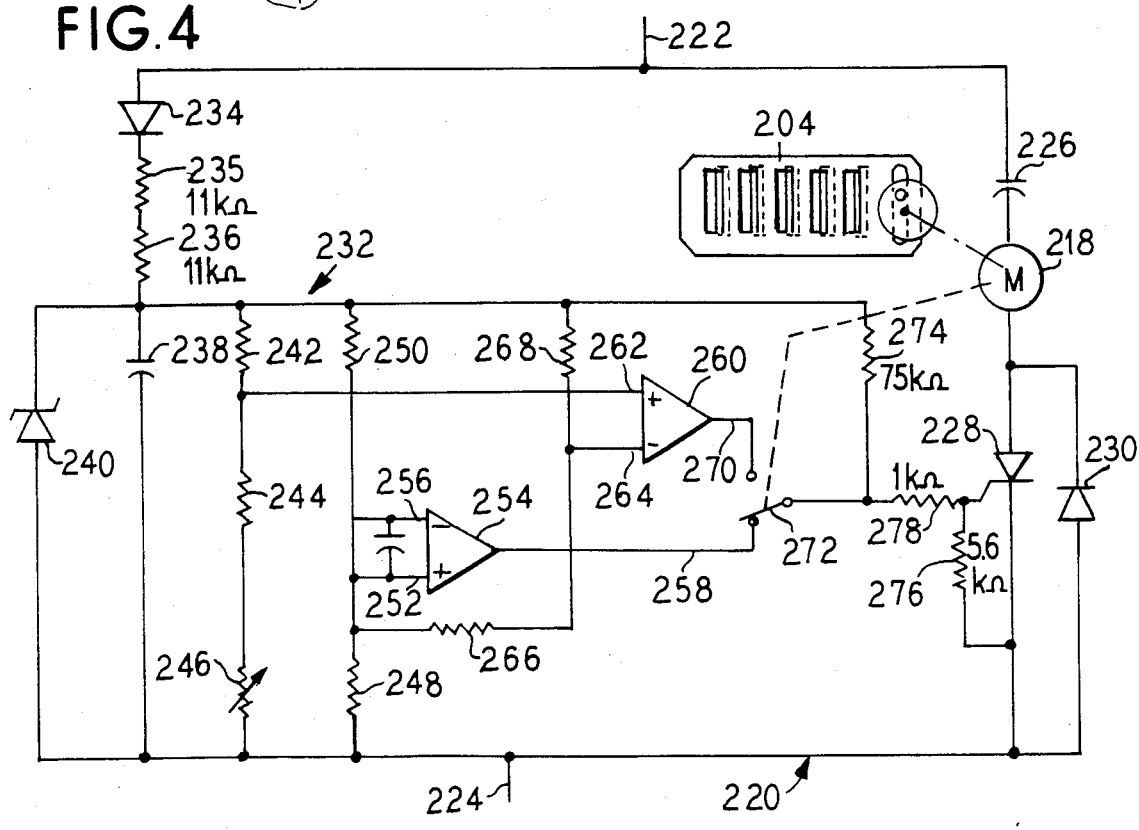
FIG. 4 is a circuit diagram of another embodiment of a control circuit of the present invention for operating the baffle shown in FIG. 3.

In FIG. 4, a control circuit 220 is powered by AC power leads 222 and 224. Connected between the AC leads 222 and 224 is the single phase AC operated motor 218 in series with a capacitor 226 and a parallel combination of an SCR 228 and a reverse-poled diode 230.

A low voltage portion 232 is powered by a rectifier diode 234 in series with a voltage dropping resistor 236 and a filtering capacitor 238. A zener diode 240 insures an accurate DC voltage level. Fixed resistors 242 and 244 and user-adjustable temperature set-point resistor 246 are connected across the low voltage portion 232 to establish reference voltage levels. A temperature sensor 248 and a resistor 250 set a first temperature-variable voltage level which is received at a noninverting input 252 of a comparator 254 for comparison to a first reference voltage level connected to an inverting input 256 thereof. When the temperature responsive signal at the input 252 reaches the level of the input 256, the comparator 254 changes state on an output lead 258.

A second comparator 260 also responds to temperature-variable signal levels in relation to a reference voltage. The reference voltage is received at a noninverting input 262 of the comparator 260 from between the resistor 242 and the resistor 244. The reference voltage on the noninverting input is compared to the temperature variable signal received at an inverting input 264 through voltage dividing resistors 266 and 268. Output changes of the comparator 260 are supplied on output lead 270.

The output leads 258 and 270 of the comparators 254 and 260, respectively, are at opposite poles of a double pole single throw switch 272, the fixed connection of which is connected to an SCR gating resistor 274. A desensitizing resistor 276 and a further resistor 278 are also provided.

As in the circuit shown in FIG. 2, the gate current of the SCR 228 is relatively small and when the SCR 228 is not triggered, the gate current is shunted to ground through either the comparator 254 or the comparator 260. The nontriggered SCR 228 blocks positive half-waves through the motor 218 to prevent motor operation. Meanwhile, the diode 230 conducts negative half-waves to charge the capacitor 226 which, when fully charged, prevents current flow through the windings of the motor 218.

With the switch 272 positioned as shown, the SCR gate current is shunted to ground by the comparator 254. When refrigerator compartment temperature, as sensed by the sensor 248, drops below the set-point temperature, the comparator 254 goes to a high state which triggers the SCR 228, causing the motor 218 to run. The motor 218, which is preferably a timer-type motor, moves the baffle 204 to a closed position and also transfers the switch 272 to the other pole. The gate circuit for the SCR 228 is now connected to the comparator 260 whose output remains low. This removes the high trigger signal from the SCR 228 gate to interrupt the motor operation.

When the temperature sensor 248 senses that the refrigerator compartment temperature has increased above the set-point temperature, the comparator 260 transmits a trigger signal to the SCR 228 through the switch 272 to start operation of the motor 218. The motor moves the baffle 204 to an open position and also transfers the switch 272 back to the first pole. This removes the trigger from the SCR 228 and interrupts the operation of the motor 218. The comparators 254 and 260 are connected to change state oppositely and at approximately the same temperature except offset by a deadband to prevent rapid cycling. Therefore, temperature changes start baffle movements and switch changes terminate baffle movements.

Although the circuits of FIGS. 2 and 4 as shown may be provided with discrete component capacitors, it is also contemplated to utilize a motor or other AC operated device wherein the capacitance is built into the AC operated device.

Thus, there has been shown and described a control circuit for AC operated devices which use SCRs as switches for lower gate currents. Because the gate current for the motor switching device must be shunted to ground, generating heat in proportion to the square of the current magnitude, when the switching device is non-conducting, it is an important advantage to have a gate control circuit that is required to supply only a small gating current, such as 0.2 ma rather than 5 ma as required for a triac. Higher efficiencies are realized by the present device making it particularly useful in refrigerated environments where control of heat dissipation is critical.

In order to achieve the desired results, the following are the preferred values for the resistors shown in FIGS. 2 and 4, within normal tolerances, of course:

| Resistor | Value |
| --- | --- |
| 118 | 1.0 megaohm |
| 122 | 5.6 kilohms |
| 128 | 75.0 kilohms |
| 132 | 75.0 kilohms |
| 133 | 1.0 kilohms |
| 274 | 75.0 kilohms |
| 276 | 5.6 kilohms |
| 278 | 1.0 kilohms |
| 56 | 11.0 kilohms |
| 58 | 11.0 kilohms |
| 235 | 11.0 kilohms |
| 236 | 11.0 kilohms |

As is apparent from the foregoing specification, the invention is susceptible of being embodied with various alterations and modifications which may differ particularly from those that have been described in the preceeding specification and description. It should be understood that I wish to embody within the scope of the patent warranted hereon all such modifications as reasonably and properly come within the scope of my contribution to the art.

The embodiments of the invention in which an exclusive property or privilege is claimed are defined as follows:

1. A control circuit for an AC operated device in refrigerated environment, comprising:
   a switch;
   means for selectively operating said switch at predetermined temperatures of said refrigerated environment to substantially block at least first half cycles of an AC signal when in a non-conducting condition;
   a rectifier connected in parallel with said switch to form a parallel combination, said rectifier conducting second half cycles of the AC signal when said switch is in a non-conducting condition;
   means for preventing heat generation in said AC operated device by substantially blocking said second half-cycles when said switch is in a non-conducting condition;
   said AC operated device connected in series with said heat generation preventing means and said parallel combination to form a series combination; and
   an AC source connected across said series combination so that said AC operated device operates when said switch is in a closed position and so that said heat generation preventing means blocks said rectified second half cycles of said AC signal transmitted through said rectifier to substantially block current flow through said AC operated device when said switch is in a non-conducting condition.

2. A control circuit as claimed in claim 1, wherein said AC operated device is a motor.

3. A control circuit as claimed in claim 1, wherein said switch is a silicon-controlled rectifier having a cathode connected to an anode of said rectifier.

4. A control circuit as claimed in claim 1, wherein said rectifier is a diode, and said heat generation preventing means is a capacitor.

5. A control circuit for an AC operated device in a refrigerator having a compartment and cooling means to cool said compartment, comprising:
   a single phase motor for operating said cooling means, and
   a control circuit located in said compartment connected to terminals of a power supply for selectively energizing said motor,
   said control circuit comprising:
      a capacitor in electrical series connection with a winding of said motor;
      switch means in electrical series connection with said capacitor and said motor winding and comprising a silicon-controlled rectifier and a diode across said rectifier poled oppositely thereto;
      a current source alternately connectable to a gate of said rectifier and to a power supply terminal, said current source capable of supplying sufficient current to gate said rectifier; and
      selection means for selectively connecting said current source to said rectifier gate and alternately to one of said power supply terminals.

6. In a refrigerator-freezer having a cabinet defining a fresh food compartment and a freezer compartment, said refrigerator-freezer further having a fan operable to move air from said freezer compartment to said fresh food compartment and a single phase AC motor connected to operate the fan, a control circuit located in one of said compartments for selectively energizing said fan, said control circuit comprising:
   a capacitor connected in series with said motor;
   a silicon-controlled rectifier having a gate lead and an anode and cathode;
   a diode connected in parallel with said silicon-controlled rectifier, an anode of said diode connected to said cathode of said silicon-controlled rectifier, said diode and said silicon-controlled rectifier connected in series with said motor and said capacitor;
   a temperature sensing element mounted in said fresh food compartment to sense temperature at said fresh food compartment;
   means for setting a set-point temperature signal level; and
   a comparator having a first input connected to said temperature sensing element and a second input connected to receive said set-point temperature signal level and an output connected to transmit a gate current to said gate lead of said silicon-controlled rectifier when said first input from said temperature sensing element exceeds said set-point temperature signal level.

7. A control circuit as claimed in claim 6, wherein said comparator includes:
a feedback resistor connected between said output and at least one of said inputs of said comparator.

8. A control circuit as claimed in claim 6, further comprising:
first and second DC supply terminals connected across said temperature sensing element and said set-point temperature signal level means and connected to supply power to said comparator; and
a first pull-up resistor connected between said first DC supply terminals and said gate lead of said silicon-controlled rectifier to supply the gate current to said gate lead when said first comparator input exceeds said set-point temperature signal level.

9. A control circuit as claimed in claim 8, further comprising:
a desensitizing resistor connected between said second DC supply terminal and said gate lead of said silicon-controlled rectifier.

10. A control circuit as claimed in claim 9, further comprising:
a first diode having a cathode connected to said gate lead of said silicon-controlled rectifier and said desensitizing resistor and having an anode;
a second diode having a cathode connected to said output of comparator and an anode connected to said anode of said first anode; and
a second pull-up resistor connected between said first DC supply terminal and said anodes of said first and second diodes.

11. A control circuit as claimed in claim 10, wherein said first pull-up resistor has a resistance value of approximately one megaohm,
said second pull-up resistor has a resistance value of approximately 75 kilohms, and said desensitizing resistor has a resistance value of approximately 5.6 kilohms.

12. A control circuit as claimed in claim 8, further comprising:
a DC power supply connected to supply low voltage DC power to said first and second DC supply terminals from AC power, said DC power supply including:
a rectifier connected between AC power and said first DC supply terminal,
at least one voltage dropping resistor in series with said rectifier,
at least one filter capacitor connected across said first and second DC supply terminals, and
a voltage regulator connected across said first and second DC supply terminals.

13. In a refrigerator-freezer connectable to AC power and having a fresh food compartment control separated from a freezer compartment by a dividing wall, control means for controlling the flow of refrigerated air between said compartments, comprising:
a baffle provided at an opening in the dividing wall and movable between an open position to enable air to flow through said baffle and a closed position to block air flow;
an AC single phase motor connected to move said baffle between the open position and the closed position;
a capacitor connected in series with said motor;
a silicon-controlled rectifier having a gate lead and a cathode and an anode;
a diode connected in parallel with said silicon-controlled rectifier, an anode of said diode connected to said cathode of said silicon-controlled rectifier, said diode and said parallel connected silicon-controlled rectifier connected in series with said capacitor and said motor;
a temperature sensing element mounted to sense temperature within the refrigerator compartment;
means for setting first and second predetermined signal levels; and
first and second comparators each having a first input connected to said temperature sensing element,
a second input of said first comparator connected to receive said first predetermined signal level,
a second input of said second comparator connected to receive said second predetermined signal level,
said first and second comparators each having an output connectable to said gate lead of said silicon-controlled rectifier.

14. A control means as claimed in claim 13, further comprising:
a switch connected to alternately connect said outputs of said first and second comparators to said gate lead of said silicon-controlled rectifier, and said AC single phase motor connected to change said switch to the alternate connections when said baffle is moved.

15. A control means as claimed in claim 13, further comprising:
first and second DC supply terminals connected across said temperature sensing element and predetermined signal level setting means and connected to supply power to said first and second comparators; and
a pull-up resistor connected between said first DC supply terminal and said gate lead of said silicon-controlled rectifier to supply gate current to said silicon-controlled rectifier.

16. A control means as claimed in claim 15, further comprising:
a desensitizing resistor connected between said gate lead of said silicon-controlled rectifier and said second DC supply terminal; and
a further resistor connected between said desensitizing resistor and said pull-up resistor.

17. A control means as claimed in claim 16, wherein said pull-up resistor has a resistance value of approximately 75 kilohms,
said desensitizing resistor has a resistance value of approximately 5.6 kilohms, and
said further resistor has a resistance value of approximately one kilohm.

18. A control means as claimed in claim 15, further comprising:
a DC power supply connected to supply low voltage DC power to said first and second DC supply terminals from AC power, said DC power supply including:
a rectifier connected between AC power and said first DC supply terminal,
at least one voltage dropping resistor in series with said rectifier,
at least one filter capacitor connected across said first and second DC supply terminals, and
a voltage regulator connected across said first and second DC supply terminals.

* * * * *